United States Patent [19]

Zook

[11] Patent Number: 5,595,780

[45] Date of Patent: Jan. 21, 1997

[54] PROCESS FOR THE PREPARATION OF PARTIALLY-DEFATTED NUTS AND PRODUCT THEREOF

[75] Inventor: Denise E. Zook, Little Falls, N.J.

[73] Assignee: Nabisco, Inc., Parsippany, N.J.

[21] Appl. No.: 470,384

[22] Filed: Jun. 6, 1995

Related U.S. Application Data

[63] Continuation-in-part of Ser. No. 209,854, Mar. 11, 1994, abandoned.

[51] Int. Cl.$^6$ .................................................... A23L 1/38
[52] U.S. Cl. ........................... 426/632; 426/93; 426/262; 426/293; 426/309; 426/607; 426/658
[58] Field of Search .................................. 426/632, 262, 426/658, 607, 93, 293, 309

[56] References Cited

U.S. PATENT DOCUMENTS

| | | | |
|---|---|---|---|
| 2,003,415 | 6/1935 | Ammann | 99/11 |
| 3,294,549 | 12/1966 | Vix et al. | 99/126 |
| 3,457,087 | 7/1969 | Renner | 99/126 |
| 3,645,752 | 2/1972 | Baxley | 99/126 |
| 3,740,236 | 6/1973 | Baxley | 99/126 |
| 4,049,833 | 9/1977 | Gannis et al. | 426/93 |
| 4,206,246 | 1/1980 | Mamahit | 426/632 |
| 4,329,375 | 5/1982 | Holloway, Jr. et al. | 426/632 |
| 4,466,987 | 8/1984 | Wilkins et al. | 426/632 |
| 4,769,248 | 9/1988 | Wilkins et al. | 426/291 |
| 5,002,802 | 3/1991 | Gannis et al. | 426/632 |
| 5,094,874 | 3/1992 | Zook | 426/632 |
| 5,149,562 | 9/1992 | Hebert et al. | 426/632 |
| 5,164,217 | 11/1992 | Wong et al. | 426/632 |
| 5,240,726 | 8/1993 | Zook et al. | 426/289 |
| 5,268,192 | 12/1993 | Zook et al. | 426/633 |

OTHER PUBLICATIONS

"Procedures in Studying And Factors Influencing The Quality And Flavor Of Roasted Peanuts" Doctoral dissertation of M. E. Mason, Oklahoma State University 1963, pp. 63 & 64.

"Low Calorie Peanuts", H. L. E. Vix, James J. Spadaro, Joseph Pominski, H. M. Pearce, Jr., Food Processing/Marketing, Sep. 1965.

"Development And Potential Of Partially Defatted Peanuts" H. L. E. Vix, Joseph Pominski, Henry M. Pearce, Jr., James Spadaro The Peanut Journal Nut World, Jan., Feb., Apr. 1967.

*Primary Examiner*—Helen Pratt

[57] ABSTRACT

The present invention relates to a process for preparing flavorful partially-defatted nuts and the nuts so prepared. The process involves partially defatting nuts and then contacting them with an edible oil under conditions such that the oil is absorbed into the nuts. The resulting nuts have the organoleptic character of full fat nuts but a much lower caloric content.

15 Claims, No Drawings

PROCESS FOR THE PREPARATION OF PARTIALLY-DEFATTED NUTS AND PRODUCT THEREOF

This is a continuation-in-part of application Ser. No. 08/209,854 filed on Mar. 11, 1994 now abandoned.

BACKGROUND OF THE INVENTION

The present invention relates to nuts, and particularly to an improved process for preparing reduced calorie nuts.

The term "nuts" as used in this description includes whole nuts, splits, and pieces of nuts such as peanuts, cashews, almonds, Brazil nuts, filberts, pecans, walnuts, and the like. For purposes of conciseness in description, the following disclosure will center around the production of low-fat peanuts. It is not intended, however, to be limited to peanuts because the principles which will apply for peanuts should apply to other nuts.

The basic procedures for preparing partially defatted nuts have been known for a number of years. For example, in U.S. Pat. No. 2,003,415 to Ammann and U.S. Pat. No. 3,294,549 to Vix et al., procedures for pressing the oil from nuts such as peanuts are described. Broadly, these methods include the steps of pressing nuts until the desired quantity of fully digestible triglyceride fats are removed and then steaming or cooking the partially defatted nuts in water until the nuts are reconstituted to substantially their original size and shape.

Both the Ammann and Vix et al. patents discuss the virtues of partially defatted nuts in the diet. It is the decrease of triglyceride fat level in partially defatted nuts that give them a significantly lower calorie content than full fat nuts. Further work on the process of Vix et al. is described in a series of articles entitled. "Development and Potential of Partially Defatted Peanuts," Peanut Journal and Nut World, January and February 1967, and an article entitled, "Low Calorie Peanuts", Food Processing/Marketing, September, 1965.

The application of a flavoring agent to nuts has also long been known in the art. For instance, U.S. Pat. No. 3,457,087 to Renner discloses a process for eliminating surface blemishes from peanuts by heating them to a temperature above the boiling point of water and then quenching in an oil bath which may contain various flavors and aroma-producing compounds. In U.S. Pat. No. 4,206,246 to Mamahit, peanuts are immersed in a boiling brine which may contain various flavorings to produce a flavored nut-meat.

Later workers, encouraged by the apparent appeal of partially defatted nuts to weight-conscious consumers, continued to work in this area. U.S. Pat. No. 3,645,752 to Baxley discloses a process which "improves" the flavor of partially defatted nuts by quenching them in a flavored oil after roasting. Although such oil quenching may improve the flavor of partially defatted nuts, it also appears to restore them to a substantially full fat content.

U.S. Pat. No. 3,740,236, also to Baxley, indicates that roasted peanut flavor is reduced in proportion to the percentage of the peanut oil removed during the pressing process. Baxley, however, does not prevent flavor loss but only attempts to improve the flavor after it is diminished. This is achieved by reconstituting partially defatted nuts in an aqueous binder solution containing flavoring.

The reason for the loss of flavor in partially defatted nuts is not fully understood. The doctoral dissertation of M. E. Mason, entitled "Procedures in Studying and Factors Influencing the Quality and Flavor of Roasted Peanuts", Oklahoma State University, 1963, pages 63 and 64, indicates that the triglyceride fat pressed from peanuts contains aleurone grains, among other particulates, which appear to contain flavor precursors. The Mason dissertation, however, is not concerned with the preparation of low-fat nuts, but simply with gaining a better knowledge of the source and identification of flavor principals in peanuts.

Gannis et al., in U.S. Pat. No. 4,049,833, also recognize the adverse effect partially defatting nuts has on flavor and texture. To correct this, the patent teaches contacting partially defatted nuts with a glycerol-containing solution to reconstitute them before roasting.

U.S. Pat. No. 4,329,375 to Holloway et al. discloses a process for preparing low-fat nuts, such as peanuts, which retain more of their natural flavor and texture than products prepared by earlier procedures. This high quality product is achieved by pre-roasting the nuts to partially develop a roasted nut flavor and color, pressing only after equilibration of the internal nut moisture, and limiting the amount of oil extraction. In U.S. Pat. No. 4,466,987 to Wilkins et al. describe the production of low fat nuts prepared by moistening, initially roasting, pressing, hydrating, and finally roasting.

Although the partially defatted nuts of Gannis et al., Holloway et al., and Wilkins et al. represent vast improvements over those products prepared simply by pressing and then cooking with hot water or steam, all such nut products inherently lack the taste and mouthfeel of full fat nuts. This problem is, at least in part, due to the lower oil content of such nuts. It is also caused by the destruction of the nut microstructure during pressing. Such structural damage is not restored by mere roasting and reconstitution. As a result, roasted, partially defatted nuts lack the crunch of full fat nuts.

SUMMARY OF THE INVENTION

The present invention relates to the preparation of nuts which have been partially defatted, roasted, and contacted (such that absorption thereinto is facilitated) with a limited amount of an edible oil. As a result, the nuts have a lower calorie content than full fat nuts, but an oily mouthfeel and, preferably, the texture of full fat nuts.

The preparation of partially defatted nuts from full fat nuts for use as a "starting material" in the present invention can be in accordance with any known procedure. One important aspect of the invention provides that the partially defatted nuts are contacted with a limited amount of the edible oil. The contact can be either prior to or after roasting (but most preferably prior to roasting). The oil is thus infused into the partially defatted nuts. As a result, the nuts have the organoleptic character (i.e., oily mouthfeel) of full fat nuts without the calories. This occurs because of the limited amount of oil with which the nuts are contacted. It is particularly advantageous to contact the nuts with an edible oil which contains a relatively high level of solids at room temperature (i.e., at least about 20% solids, more preferably at least about 30% solids, at 70° F.) to restore added crunch to the nut.

Advantageously, the edible oil contains or is combined with additives such as natural or artificial flavoring agents (preferably nut extracts), stabilizers, vitamins, and, optionally, sweeteners (artificial and/or natural).

DETAILED DESCRIPTION OF THE INVENTION

Low fat nuts with the organoleptic character of full fat nuts are produced according to the present invention by what is generally a multi-stage process. In a first stage, partially defatted nuts are provided. In further stages, nuts from the first stage are contacted in one or more ways with a limited amount of an edible oil.

The preparation of partially defatted nuts in the first stage can be carried out by any one of several processes. For example, any of the processes of Ammann, Vix et al., Gannis et al., Holloway et al., or Wilkins et al., all of which are hereby incorporated by reference, can be used. Moreover, the processes taught by Gannis et al. in U.S. Pat. No. 5,002,802 and Zook in U.S. Pat. No. 5,094,874 (the disclosures of each of which are also incorporated by reference herein) for preparing partially defatted nuts can be employed.

Partially defatted nuts may be prepared by mechanically pressing raw nuts to extract at least about 30%, and most commonly about 40% to about 52%, of their initial oil content. This can be achieved, for example, by employing a Carver Press at applied pressures of greater than about 1,000 pounds per square inch (psi) for about 15 to about 120 minutes. Although the exact times and pressures for oil extraction can be varied to obtain the desired degree and rate of extraction, pressures of no greater than about 1,700 psi, particularly about 1,100 to about 1,500 psi, are preferred. Although pressures above this range will extract oil more rapidly, more physical damage to the nuts and possibly a reduction in the amount of retained natural flavors can occur. Pressures below the disclosed range can be employed with somewhat less nut breakage, but the time required for extraction of the desired amount of oil will increase. By utilizing the above-described pressing conditions, a desirable balance between calorie reduction and final product flavor and texture can be achieved with oil reduction of between about 40% and about 52 %. Preferably, the pressure is elevated to the desired level as quickly as possible.

Recently, the preparation of defatted nuts having more of the oil extracted therefrom has become feasible. Such nuts have up to about 75 % of their initial oil content extracted, and sometimes even more. It is not impossible for defatted nuts having over 80% of their initial oil content removed to be prepared. As used herein, therefore, the term "partially defatted nuts" will refer to nuts which have had at least some of their initial oil content removed, generally at least about 30% and, more narrowly, about 40% to about 80% removed.

After pressing, the nuts are flat and undesirably dense. It is, therefore, appropriate to expand (or reconstitute) the nuts to bulk densities which approximate those of full fat nuts. The bulk densities sought when low fat nuts are to be prepared will generally approach about 0.40 grams per cubic centimeter (g/cc) (determined, for instance, by filling a 500 cubic centimeter graduated cylinder with nuts, determining the weight of the nuts, and dividing the weight in grams by the volume in cubic centimeters). Preferably, the bulk density of the reconstituted nuts will be within the range of about 0.32 to about 0.39 g/cc.

Expansion can be effected by contacting the defatted nuts with sufficient water to reconstitute them when subsequently roasted. Such contact is preferably at a level of about 3 to about 7, more preferably about 4 to about 6, pounds of water per hundred pounds of nuts. In an alternate embodiment, the nuts can be reconstituted in an edible oil, at levels of about 2 to about 7, more preferably about 3 to about 5, pounds per hundred pounds of nuts, in order to provide contact with the oil. The oil will then be absorbed into the nuts to a limited extent (about 3% to about 5% by weight). This can be the sole contact between the edible oil and the nuts, or it can be used in addition to other contact methods detailed herein. The water or oil and nuts may be contacted in any suitable mixing device such as a rotatable coating drum to effect reconstitution.

Alternatively, the nuts can be reconstituted using steam. Although pressurized steam can be employed for reconstitution, steam at atmospheric pressure has been found to be effective and is preferred. The use of steam or pressurized steam may have economic disadvantages when compared with merely contacting the nuts with water or edible oil, because of the additional capital outlay, etc., however, it has been found that nuts reconstituted in this manner exhibit superior texture and flavor after roasting. The exact reason for this is unknown, but it is believed that steam or pressurized steam reconstitution opens the pores of the nuts more effectively, which leads to the observed improvements on roasting. These improvements may justify the additional capital outlay, etc. involved with steam-mediated reconstitution.

When steam or pressurized steam is used to reconstitute the nuts, the nuts are contacted with the steam in a suitable vessel, such as a rotatable coating drum when steam at atmospheric pressure is used, or a pressure cooker or steam chamber when pressurized steam is used. Contact with the steam should continue for a time sufficient to achieve satisfactory reconstitution. Advantageously, steam reconstitution proceeds for about 30 seconds to about five minutes, more preferably about 45 seconds to about four minutes, to ensure a desirable level of reconstitution.

Often, however, a separate reconstitution step is not necessary. The nuts can expand to the desired bulk densities during the infusion step detailed herein. In situations where expansion can occur without a reconstitution step, the reconstitution step is eliminated, resulting in a more efficient and commercially attractive process.

After reconstitution (or if reconstitution is not necessary, after defatting), the nuts are roasted and then contacted with the edible oil or contacted with the edible oil and then roasted. Contact with the oil after roasting can produce satisfactory low calorie nuts. However, it is highly preferred that contact be prior to roasting when infusion contact with the edible oil is desired, for closest approximation of full fat nuts.

The nuts are infused with an edible oil by contacting therewith under suitable conditions. The edible oil can be any conventional vegetable oil utilized in foods, including coconut, nut, sesame, cottonseed, corn, or palm oil, which may be partially or wholly hydrogenated. Advantageously, a nut oil derived from the same type of nut as the partially-defatted nut of this invention is utilized.

For instance, if the partially-defatted nut is a peanut, the oil is peanut oil. However, it is not necessary to use oil from the same sub-type of nut as the partially-defatted nut. For example, if the partially-defatted nut is a Jumbo Runner peanut, it is not necessary to use the oil from Jumbo Runner peanuts. In fact, superior results can be achieved when partially-defatted Jumbo Runner peanuts are infused with oil extracted from Spanish peanuts.

Preferably, the oil contains one or more flavoring agents which are thereby incorporated into the nuts. Suitable flavoring agents include nut flavor concentrates which are naturally present in nuts or nut oil. Such materials can be obtained by a variety of conventional techniques (e.g., dark roasting nuts and then extracting the nut oil) and are often available commercially. These nut flavor concentrates can be recovered from nuts which are either the same as or different from the partially-defatted nut being infused. Other components of the flavoring agents employed can be oils, soy sauce, seasonings like salt, yeast and starches.

The flavoring agents employed are generally present in the oil at a level of at least about 0.10% by weight, and more preferably of at least about 0.12% by weight to provide a noticeable flavor improvement. Generally, there is no need to provide flavoring agents in the oil at a level of greater than about 0.60% to provide a desirable flavor improvement. Advantageously, the flavoring agents are present at about 0.14% to about 0.32% by weight. Different flavoring agents can be combined in the edible oil to be absorbed into the defatted nuts to provide a low fat nut with organoleptic characteristics which closely mimic a full fat nut.

For instance, a peanut flavoring consisting primarily of nut extracts, a "fried" flavoring consisting of a partially hydrogenated vegetable oil, autolyzed yeast, dehydrated soy sauce, modified food starch and salt (which provides a deep fat fried aroma and taste), and a "mouthfeel" flavoring can be combined. These flavorings can be combined in a ratio of about 0.75–1.25: 0.75–1.25:0.75–2.25 and included in the edible oil to provide a superior nut.

Other flavoring agents which can be employed include: fruit flavors, chocolate or other confectionery flavors; mint flavor; honey flavor, the flavor of alcoholic beverages such as beer, wine, and whiskey; and other desired artificial or natural flavors, and mixtures thereof.

In addition, the flavoring agents can be encapsulated by known techniques for a superior flavor note. Moreover, encapsulation will also serve to protect flavoring agents which may be sensitive to handling or otherwise subject to degradation during the infusion operation or storage of the resulting nuts. Such agents include artificial sweeteners, such as aspartame, and fat soluble vitamins, such as vitamins A, D, and E.

Other desired additives such as texturizers may also be included in the edible oil infusant. Suitable texturizers include fiber, especially pea fiber, bulking agent such as methylcellulose, and corn syrup solids. These texturizers assist in the formation of a finished product having a texture and color more nearly that of full-fat nuts.

It has been found that improved flavor of the finished product can be obtained when the edible oil infused into the nuts is oil in which nuts have previously been roasted. Although not fully understood, it is believed that roasting oils take up flavor components of the material being roasted therein. Accordingly, these flavor components can be transferred to the nuts in which the oil is infused. The roasting oil can be taken from the roasting of any material whose flavoring components are desired to be imparted to the nuts. Suitably, the oil is taken from the roasting of nuts, preferably the same type of nut as being infused. It is not necessary, though, to use oil used to roast the same sub-type of nut as being infused.

In addition to the edible oil, the infusant with which the partially defatted nuts are contacted can also include a second component, which provides a desired roasted nut color after roasting. For instance, a browning solution, especially an aqueous solution containing corn syrup, honey or the like can be employed. Advantageously, the solution is an aqueous solution of both corn syrup (preferably about 7.5% to about 13% by weight) and honey (preferably about 8% to about 13.5% by weight). In this way, "Maillard" browning occurs, leading to a more desirable color for the finished nuts. Additionally, the presence of this solution in the infusant reduces the amount of oil taken up by the nuts.

The browning solution can be admixed with the edible oil, but is most preferably applied to the nuts separately, and prior to the edible oil. Generally, this second component comprises about 30% to about 85%, more preferably about 40% to about 75%, most preferably about 52% to about 60% by weight of the total infusant.

The infusion step is distinguishable from prior art oil quenching operations by virtue of the weight ratio of infusant in contact with the nuts. This difference is even more striking when the infusant comprises significant amounts of a second component such as a corn syrup solution.

When quenching, the nuts are immersed in a bath, causing the nuts to return to approximately a full fat level (i.e., about 50 to about 55 weight %). By contrast, in the infusion contacting step of the present invention, a large amount by weight of nuts is contacted with a relatively small quantity of infusant. As a result, only a limited quantity of oil is capable of being infused into the nuts, maintaining a low calorie content. The quantity of infusant utilized is about 2 to about 15, preferably about 7 to about 10, pounds of infusant per 100 pounds of nuts, when both infusant components are utilized. When only the edible oil component is utilized, the quantity of infusant will be about 3 to about 7, more preferably about 4 to about 6.5, pounds of infusant per 100 pounds of nuts. The application of infusant will return the fat content of the nuts to about 28% to about 36% by weight.

In the infusion operation, both the nuts and the infusant should be at room temperature. More specifically, they should be between about 50° F. and about 80° F., more preferably about 65° F. and about 75° F. It is desirable, but not critical, that both the nuts and the infusant be at approximately the same temperature, although the oil may have to be heated to liquefy it. An acceptable product is produced when the infusant is at a lower temperature than the nuts or the nuts are at a lower temperature than the infusant, although the former situation may be less preferred.

With both the nuts and the infusant at relatively low temperatures, contacting the nuts with the edible oil may cause the oil to solidify on the surface of the nuts (depending on the melting temperature of the oil). When this occurs, the nuts can be warmed to a temperature sufficient to melt the oil (usually 75° F. is sufficient) which will cause the oil to infuse into the nuts.

Infusion of the edible oil into the nuts is achieved by differential pressure. This is carried out by drawing a vacuum on the partially defatted nuts prior to contact with the infusant. Vacuum should be drawn at a level of at least about 20, and preferably of about 25 to about 40 inches of mercury; more preferably about 28 to about 34 inches of mercury. While the nuts are still under vacuum, they are contacted with the browning solution (when employed) and the edible oil infusant, preferably by spraying. The vacuum is held for at least about four minutes, more preferably at least about six minutes after addition of the infusant, and then broken. There appears to be no additional benefit from holding the vacuum for longer than about fifteen minutes. While under vacuum, the nuts should be rotated to ensure adequate contact with the infusant. It is not necessary to break the vacuum when adding the browning solution and/or the oil infusant; however doing so will not severely hamper infusion.

The application of vacuum to the partially defatted nuts has been found to facilitate absorption of the infusant into the nuts. Although the exact mechanism by which this occurs is not fully understood, it is believed that the vacuum eliminates excess moisture from the nuts and opens the nut pores to a greater extent, leading to better absorption.

After release of the vacuum, the nuts are subjected to pressure of at least about 85 pounds per square inch (psi) more preferably about 90 to about 110 psi, for at least about 1 minute, and more preferably about 2 to about 8 minutes. Pressures as high as those referred to as "ultra high" pressures (i.e., up to about 3500 psi, and generally about 300 to about 3000 psi) can be employed, but the capital expense may not justify any increases in quality. More preferably, the pressure is at a level of about 10 to 300, most preferably about 85 to 200 psi. This pressure "forces" the infusant into the nut pores. Advantageously, pressure is applied to the nuts as noted, after which the nuts are held for from up to about 1 hour to about 8 hours to allow for absorption into the nuts of the edible oil infusant. Alternatively, the nuts can be held for up to about 24 hours or longer in place of the application of pressure.

After infusion, the nuts can be coated with a mixture of spices or seasonings to provide a more desirable flavored nut. Preferably, the nuts are first coated with an adhesive or predust in order to enhance adhesion of the spice or seasoning coating. Included among the adhesion coatings are dry coatings of starch or gelatin and a gelatin solution. Preferably, as taught by Wilkins et al. in U.S. Pat. No. 4,769,248, a first pre-dust coating of starch is applied to the nuts and then a coating of a gelatin solution is applied to the starch coated nuts. Alternatively, a coating of gelatin can be applied to the nuts, either as a dry powder followed by water or a gelatin solution; or as the gelatin solution itself, after roasting, as taught by Hebert and Holloway in U.S. Pat. No. 5,149,562; or a predust coating of a gum, such as gellan gum, at a level of about 1% to about 5%, can be applied to the nuts. After this, the spice or seasoning mix can be applied to the coated nuts.

The spice or seasoning mix can include conventional nut seasonings such as sugar, salt, dried honey, monosodium glutamate, yeast, gelatin, dried corn syrup, allspice, cinnamon, clove, caraway, bay, sage, ginger, basil, paprika, garlic powder, onion powder, or mixtures thereof.

Prior to, or in place of, the spice or seasoning mix (including any gelatin, gum or starch application), the nuts can be coated with about 5 to about 12 pounds per 100 pounds of nuts of a syrup to provide a desired flavor note. For instance, if a honey roasted flavor is desired, the syrup can comprise honey (about 25% to about 40% by weight of the syrup), corn syrup (about 15% to about 30% by weight of the syrup) and sugar (about 25% to about 40% by weight of the syrup). The syrup can also comprise water (i.e. about 5% to about 10% by weight), a minor amount of a gum, such as xanthan gum (i.e. about 0.1% to 0.2%) and flavorings, such as peanut or fried flavor (i.e. about 0.2% to 0.3%).

The nuts are then roasted. The roasting process is preferably oil roasting, although dry roasting (i.e., roasting in the substantial absence of added oil, usually less than 10% by weight of the nuts, and most preferably none), can also be effected.

Typically, the nuts are roasted to a moisture content of less than about 3%, preferably less than about 2%, and most preferably about 1.5% or less. The degree to which the nuts are roasted should correspond to an Agtron color photometer reading of about 60 to about 95 in the green mode with 12% and 33% plates defining the reading scale. Most preferably, the reading will be within the range of about 80 to about 90.

When oil roasting, typically, the nuts are roasted in an edible oil such as refined peanut oil at a temperature in the range of about 240° F. to about 350° F., preferably from about 285° F. to about 325° F., and for a time which will vary depending upon the particular type of nut being processed and upon the temperature of roasting and the degree of roasting desired. It has been found that with oil roasting, a minor amount of roast oil is absorbed into the nuts, on the order of about 3% to about 5% by weight of the nuts. Oil roasting, therefore, does not significantly affect the low calorie nature of the nuts, and can comprise the desired contact between partially defatted nuts and edible oil sought therein.

In a preferred embodiment, the nuts are oil roasted by carrying them on a mesh belt through a heated bath of the roasting oil. Because of the reduced densities of the nuts after having been defatted, a mesh holddown belt is employed to control the floating of the nuts and maintain them on the carrying belt.

Illustratively, the time and extent of roasting will be greater in the case of peanuts (from about 4.5 to about 14 minutes) than in the case of cashews (from about 1.5 to about 7 minutes). The most appropriate roasting conditions to be adopted in any particular instance can be determined readily by the skilled artisan.

Dry roasting (i.e., air or granular roasted) involves roasting the nuts in any suitable manner that gives them the characteristic taste and texture of roasted nuts as described above. In air roasting, the nuts are roasted in a stream of hot air at a temperature of about 260° F. to about 400° F., advantageously about 280° F. to about 335° F. Roasting times and temperatures can be varied depending upon the particular type of nut being processed, as well as the roasting temperature and degree of roasting desired. Illustratively, the time and extent of roasting will be greater for peanuts (i.e., about 10 minutes to about 35 minutes) than for cashews (i.e., about 3 minutes to about 15 minutes). The most appropriate conditions to be adopted in any particular instance can be readily determined by the skilled artisan.

In granular roasting, the nuts are contacted with a finely divided heat transfer media which is heated to a temperature of about 315° F. to about 465° F., preferably about 380° F. to about 410° F. Roasting times and temperatures will vary depending upon the particular type of nut being processed and the degree of roasting desired. Illustratively, the time and extent of roasting will be greater in the case of peanuts (i.e., about 1 minute to about 9 minutes), than in the case of cashews (i.e., about 30 seconds to about 3 minutes).

The finely divided heat transfer media can be any suitable finely divided material which will absorb heat from a heat source, such as a flame, and transfer the heat to the nuts upon contact. Preferably, the finely divided heat transfer media is salt, ceramic beads, sand, or metal balls, and is most preferably ceramic beads.

After infusion and roasting, the nuts may be glazed with an oil, generally at a level of about 2% to about 6%, more preferably about 3% to about 4.5% by weight of the nuts. Alternatively, or in addition, the nuts can also be coated with various powdered flavoring agents such as sugar, dry honey, allspice, cinnamon, clove, caraway, bay, sage, ginger, basil, and the like at a level of about 4 to about 8 pounds per 100 pounds of nuts. These materials can be employed alone or with condiments such as salt, pepper, monosodium glutamate, and the like. In addition, texturizers such as, glycerine and polypropylene glycol, and binders such as, natural gums, dextrins, gelatin, sugars, and the like, can be applied.

After the nuts have been defatted, infused and roasted (and coated, if desired), they are preferably cooled and packaged. In fact, the reduced calorie, infused nuts of the present invention can be packaged with full-fat nuts to provide a package of nuts having an overall reduction of fat and calories when compared with a package containing only full-fat nuts. For instance, it is anticipated that a blend comprising about 60% of the low fat nuts prepared by the process disclosed herein and about 40% of full-fat nuts will result in a net decrease in calories of the blend of between about 8% and about 15%, and a net decrease in fat of between about 15% and about 25%.

In addition, when low fat nuts are packaged with full-fat nuts in this manner, flavor and texture improvements in the low fat nuts are detected. Although the reason for this is not fully understood, it is believed that gas exchange between the nuts takes place in the package, leading to the observed flavor and textural improvements. Moreover, the combination of low-fat and full-fat nuts in the same package may lead to interesting textural and mouthfeel sensations for the consumer.

The following examples are presented to further illustrate and explain the present invention and should not be viewed as limiting in any regard. Unless otherwise indicated, all parts and percentages are by weight, and are based on the weight of the product at the particular stage in processing indicated.

EXAMPLE

Raw, blanched, Jumbo Runner peanuts (224 lbs.) are pressed in an Anco Vertical Press, with the pressure slowly raised to 1,500 psi until 56 lbs. of oil have been pressed out, leaving 168 lbs. of pressed peanuts. The peanuts are then charged into an Odenberg blender, and maintained under a vacuum of 29 inches of mercury. While still under vacuum, 5% (based on the weight of the nuts) of a solution comprising 10% corn syrup and 10% honey and 5% (based on the weight of the nuts) of peanut oil flavored with peanut flavor, "fried" flavor and "mouth-feel" flavor are added. The vacuum is then released and pressure of 100 psi applied. After release of the pressure, the nuts are held for about 1 hour.

The infused nuts are then charged to a coating drum and coated with 2% (based on the weight of the nuts) of a predust coating of a gellan gum followed by about 8% (based on the weight of the nuts) of a syrup solution comprising honey, corn syrup, sugar, water, xanthan gum, peanut flavor, and "fried" flavor, and also coated with about 7% (based on the weight of the nuts) of dried honey and about 7% (based on the weight of the nuts) of sugar. The nuts are then oil roasted at 290° F. for about 12½ minutes. The roasted nuts are subjected to a final coating of sugar, salt and dried honey and cooled.

The resulting nuts are found to have a taste, mouthfeel and crunch approximating full fat nuts.

Although the invention has been described in detail for the purpose of illustration, it is understood that such detail is solely for that purpose, and variations can be made therein by those skilled in the art without departing from the spirit and scope of the invention which is defined by the following claims.

What is claimed:

1. A process for producing low calorie nuts with the organoleptic character of full fat nuts comprising:
    a) providing raw nuts which have had at least some of the oil removed therefrom so that they are partially defatted;
    b) applying a vacuum of at least about 20 inches of mercury to the partially defatted nuts;
    c) contacting the partially defatted nuts with an infusant at a level of at least about 2% to about 15% by weight of the nuts, wherein the infusant comprises about 25% to about 60% of a first component comprising an edible oil and about 40% to about 75% of a second component which facilitates the formation of a desired nut color after roasting and whereby the infusant is absorbed into the nuts;
    d) releasing the vacuum applied to the nuts;
    e) applying a pressure of at least 10 psi to the nuts;
    f) releasing the pressure applied to the nuts;
    g) holding the nuts for at least about one hour; and
    h) thereafter roasting the partially defatted nuts.

2. The process of claim 1, wherein said nuts are selected from the group consisting of peanuts, almonds, Brazil nuts, filberts, pecans, walnuts, and mixtures thereof.

3. The process of claim 1, wherein said edible oil contains a flavoring agent.

4. The process of claim 1, wherein said edible oil comprises oil previously used to roast nuts.

5. The process of claim 1, wherein oil is removed from said nuts by pressing to reduce the oil content of the raw nuts by about 40% to about 52%.

6. The process of claim 5, which further comprises reconstituting said nuts after pressing by contacting them with water or an edible oil at a level of 3 to 7 pounds of water or edible oil per hundred pounds of nuts.

7. The process of claim 5, which further comprises reconstituting said nuts after pressing by contacting them with steam or pressurized steam for about 30 seconds to about three minutes.

8. The process of claim 1, wherein the second component of said infusant comprises a solution which comprises corn syrup, honey or mixtures thereof, at a level of about 40% to about 85% by weight.

9. The process of claim 1, wherein said nuts are roasted with oil at a temperature of about 240° F. to about 350° F.

10. A process according to claim 1, wherein the roasted, partially defatted nuts have a moisture content of less than 3% and are roasted to a color level of 60 to 95 measured on an Agtron color photometer employed in the green mode with 12% and 33% plates defining the reading scale.

11. A nut produced according to the process of claim 10.

12. A process according to claim 1, wherein the edible oil is present during said contacting in an infusion liquid which further comprises additives selected from the group consisting of vitamins, flavoring agents, and sweeteners.

13. A process according to claim 1, wherein the vacuum is held for at least about four minutes and then broken.

14. A nut produced according to the process of claim 13.

15. A nut produced according to the process of claim 1.

* * * * *